Sept. 17, 1963 M. COHEN ETAL Re. 25,448

COMBINED CONTAINER AND STRAW

Original Filed June 13, 1961

INVENTORS.
MAX COHEN
EDWARD R. ELSTON
BY M. A. Gray
AGENT

United States Patent Office

Re. 25,448
Reissued Sept. 17, 1963

25,448

COMBINED CONTAINER AND STRAW

Max Cohen and Edward R. Elston, Ontario, Calif., assignors of one-third to Martin J. Siegel, Los Angeles, Calif.

Original No. 3,021,991, dated Feb. 20, 1962, Ser. No. 116,843, June 13, 1961. Application for reissue Jan. 8, 1963, Ser. No. 250,469
3 Claims. (Cl. 229—7)

Matter enclosed in heavy brackets [ ] appears in the original patent but forms no part of this reissue specification; matter printed in italics indicates the additions made by reissue.

This invention relates to beverage containers of the type having a built-in straw, but with certain structural improvements therein which provides for added convenience of the said built-in straw in the conventional container having the usual pouring spout, without adding materially to the production cost or in any way interferring with stacking or handling of such containers.

A primary object of this invention is the unitary construction of the pouring spout seal and the extension therefrom which covers the end of the straw which projects outside of the container.

A further object of this invention resides in the fact that the straw covering tab protects the straw from contamination and seals the air vent, and, after use of the straw may be partially resealed for continued use.

Another object of this invention allows entirely independent use of either the pouring spout or the straw.

Although the foregoing objects are regarded as primary in this invention, other features will become apparent as the specification proceeds and from the illustration in the drawings, in which.

Figure 1:
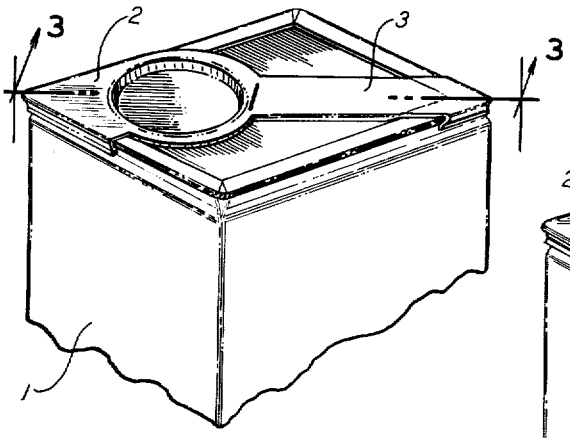
FIG. 1 is a fragmentary perspective view of the combined container and straw as it appears in closed position.
Figure 2:
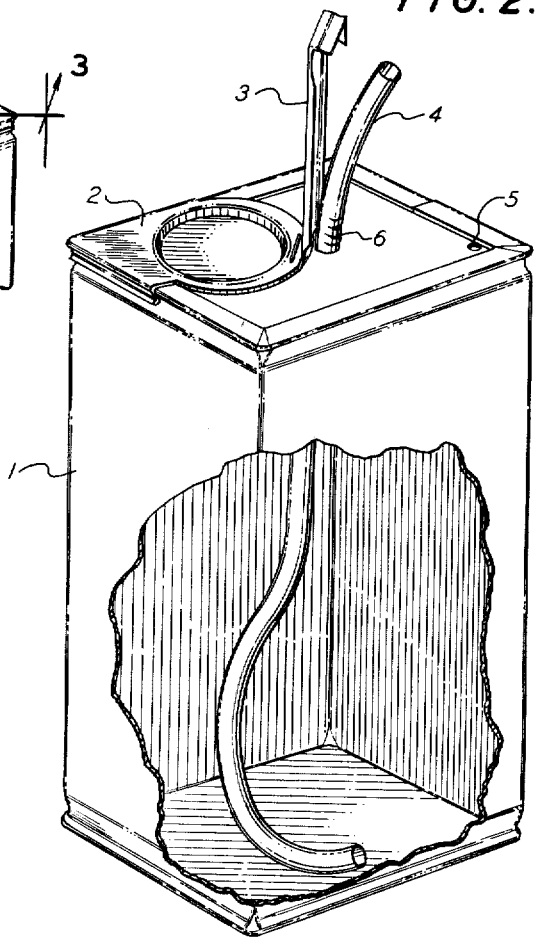
FIG. 2 is a perspective view thereof, with parts of the container broken away and showing the straw in position for use.
Figure 3:
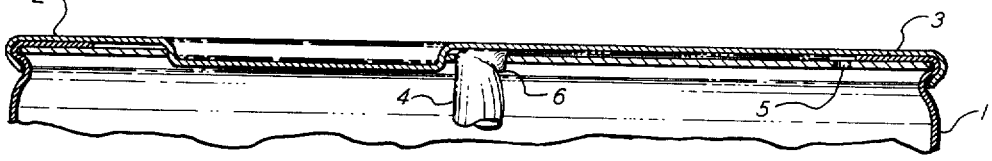
FIG. 3 is a fragmentary vertical section on the line 3—3 of FIG. 1 and shown to a somewhat enlarged scale.

Referring now to the accompanying drawings in detail, and more particularly to FIGURES 1, 2 and 3 the container is designated generally by the reference character 1 and is the shape and form of a rather conventional carton or container, not unlike the type used for dispensing milk or like beverages.

The essential feature of novelty of the invention resides in the sipping straw 4 which, prior to use is tightly sealed by the tab 3 as shown in FIG. 1. This tab is hingedly secured to the top center portion of the container and is integral with the main pouring spout seal 2 which is provided with a usual type of depressed well formation.

It will be observed that the firmly seated pouring spout seal 2 together with the securing clip provides a good support for the straw cover 3, and facilitates the sealing process when the containers are being filled, then pressed and crimped into the position ready for use.

By reference to the straw 4 it will be noted that indentations 6 are provided to prevent a buckling or deforming of the said straw prior to use. There is a vent 5 shown in FIGS. 2 and 3 which is sealed when tab 3 is closed.

Figure 4:
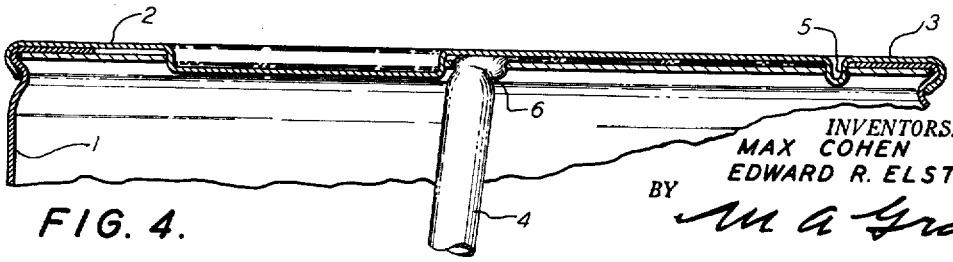
FIG. 4 is a fragmentary vertical sectional view similar to FIG. 3 but showing a modified form of the closure means for the vent opening.

In a modified form, shown in FIG. 4, the venting opening is sealed by a complementary element projecting from the tab 3. In this form the straw extends only to the venting opening, instead of across the same as indicated in FIG. 2.

While we have shown and described certain specific forms of our invention, in a preferred form, it is understood that various changes and modifications may be made, as deemed desirable within the scope of the appended claims.

We claim:

1. In a liquid container having an enclosed volume and a ported top, the combination comprising a straw extending from the [bottom] *interior* of said container through a [tight-fitting] hole [in the top center thereof,] *therein* and extending [to a corner of the recessed top] *across a portion of the container* and being held in a bent position by a sealing tab which [tightly] encloses the outer end of the straw and seals a vent opening thereunder, the said sealing tab being held in closed position by crimping at an outer corner and being integrally formed with a conventional pouring spout seal, and being hingedly fastened to the container [top] to provide access to the straw.

2. In a liquid container having an enclosed volume and a ported top, the combination comprising a straw extending from the [bottom] *interior* of said container through a [tight-fitting] hole [in the top center thereof] *therein*, said straw being indented at the point of contact with the edge of the hole and extending [to a corner of the recessed top] *across a portion of the container* and being held in a bent position by a sealing tab which tightly encloses the outer end of the straw and seals a vent opening thereunder, the said sealing tab being held in closed position by crimping at an outer corner and being integrally formed with a conventional pouring spout seal, and being hingedly fastened to the container top to provide access to the straw.

3. In a liquid container having an enclosed volume and a ported top, the combination comprising a straw extending from the bottom of said container through a tight-fitting hole [in the top center thereof] *therein*, said straw being indented at the point of contact with the edge of the hole, and extending to the venting hole in the recessed top and being held in a bent position by a sealing tab which encloses the outer end of the straw and seals a vent opening thereunder by means of a projection from the straw sealing tab, the said sealing tab being held in closed position by crimping at an outer corner and being integrally formed with a conventional pouring spout seal, and being hingedly fastened to the container top to provide access to the straw.

References Cited in the file of this patent or the original patent

UNITED STATES PATENTS

| | | |
|---|---|---|
| 2,800,265 | Pugh | July 23, 1957 |
| 2,844,267 | Petriccione | July 22, 1958 |